United States Patent [19]

Stix et al.

[11] Patent Number: 4,652,607
[45] Date of Patent: Mar. 24, 1987

[54] THERMOPLASTIC MOULDING COMPOSITIONS

[75] Inventors: Wolfgang Stix; Werner Nouvertné, both of Krefeld; Hartmuth Buding, Dormagen, all of Fed. Rep. of Germany

[73] Assignee: Bayer Aktiengesellschaft, Leverkusen, Fed. Rep. of Germany

[21] Appl. No.: 759,133

[22] Filed: Jul. 25, 1985

Related U.S. Application Data

[63] Continuation of Ser. No. 569,840, Jan. 11, 1984, abandoned.

[30] Foreign Application Priority Data

Jan. 22, 1983 [DE] Fed. Rep. of Germany ....... 3302124

[51] Int. Cl.$^4$ .................... C08L 67/02; C08L 69/00
[52] U.S. Cl. .................................... 525/67; 525/148; 526/329.3
[58] Field of Search ................ 525/148, 67; 526/329.3

[56] References Cited

U.S. PATENT DOCUMENTS

| | | | |
|---|---|---|---|
| 3,591,659 | 7/1971 | Brinkmann | 525/176 |
| 3,742,088 | 6/1973 | Holder | 525/143 |
| 4,257,937 | 3/1981 | Cohen | 525/67 |
| 4,264,487 | 4/1981 | Fromuth | 525/67 |
| 4,320,212 | 3/1982 | Liu | 525/148 |
| 4,482,672 | 11/1984 | Neuray et al. | 525/67 |

FOREIGN PATENT DOCUMENTS

| | | |
|---|---|---|
| 0064648 | 4/1982 | European Pat. Off. . |
| 1810993 | 6/1970 | Fed. Rep. of Germany . |
| 2843041 | 4/1980 | Fed. Rep. of Germany . |
| 1253226 | 11/1971 | United Kingdom . |

Primary Examiner—John C. Bleutge
Assistant Examiner—Patricia A. Short
Attorney, Agent, or Firm—Connolly & Hutz

[57] ABSTRACT

The present invention relates to thermoplastic moulding compositions of (A) thermoplastic polycarbonates, if appropriate mixed with (B) thermoplastic polyalkylene terephthalates and, if appropriate, additionally with (C) elastomeric graft polymers, characterized in that they contain (D) a terpolymer of acrylates, vinyl esters and unsaturated nitriles.

8 Claims, No Drawings

THERMOPLASTIC MOULDING COMPOSITIONS

This is a continuation of copending application Ser. No. 569,840 filed Jan. 11, 1984, now abandoned.

The present invention relates to thermoplastic moulding compositions containing (A) thermoplastic, aromatic polycarbonates with weight-average molecular weights $\overline{M}w$ between 10,000 and 200,000 ($\overline{M}w$ determined by means of light scattering) and, if appropriate, (B) thermoplastic polyalkylene terephthalates in a ratio of polycarbonate to polyalkylene terephthalate of between 99:1 and 1:99, preferably between 85:15 and 10:90, and if appropriate additionally (C) elastomeric graft polymers in amounts of 1 to 30% by weight, preferably 5 to 25% by weight, based on the sum of the weights of (A) and (B), characterised in that the moulding compositions contain (D) terpolymers which consist of 85 to 54% by weight of acrylates, 12 to 34% by weight of vinyl esters and 3 to 12% by weight of unsaturated nitriles, have a Mooney viscosity of at least 40 Mooney Units (ML 1+4/100° C. according to DIN 53523) and are gel-free (measured in toluene), wherein the amount by weight of terpolymer (D) is, if (C) and (B) are present, between 0.5 and 7% by weight, preferably between 1 and 5% by weight, based on the sum of the weights (A)+(B), or, if (C) is absent but (B) is present, between 1 and 30% by weight, preferably between 5 and 25% by weight, based on the sum of the weights (A)+(B), or, if (B) and (C) are absent, between 2 and 30% by weight, preferably between 5 and 20% by weight, based on the sum of the weights (A)+(D).

The preferred composition of the terpolymer component (D) is 85 to 60% by weight of acrylate, 12 to 28% by weight of vinyl ester and 3 to 12% by weight of unsaturated nitrile.

COMPONENTS (A) TO (D)

Component (A)

In the context of this invention, aromatic polycarbonates (A) are understood as meaning the known homopolycarbonates, copolycarbonates and mixtures of these polycarbonates which are based, for example, on at least one of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)sulphides, bis-(hydroxyphenyl)ethers, bis-(hydroxyphenyl)ketones, bis-(hydroxyphenyl)-sulphoxides, bis-(hydroxyphenyl)-sulphones, α,α'-bis-(hydroxyphenyl)-diisopropylbenzenes, and nuclear-alkylated and nuclear-halogenated derivatives thereof.

These and other suitable diphenols are described, for example, in U.S. Pat. Nos. 3,028,365, 3,275,601, 3,148,172, 3,062,781, 2,991,273 and 2,999,846, in German Offenlegungsschriften Nos. 1,570,703, 2,063,050, 2,063,052 and 2,211,957, in French Patent Specification No. 1,561,518 and in the monograph by H. Schnell, "Chemistry and Physics of Polycarbonates", Interscience Publishers, New York 1964.

Examples of preferred diphenols are 4,4'-dihydroxydiphenyl, 2,4-bis-(4-hydroxyphenyl)-2-methylbutane, α,α'-bis-(4-hydroxyphenyl)-p-diisopropylbenzene, 2,2-bis-(3-methyl-4-hydroxyphenyl)-propane and 2,2-bis-(3-chloro-4-hydroxyphenyl)-propane.

Examples of particularly preferred diphenols are: 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 2,2-bis-(3,5-dimethyl-4-hydroxyphenyl)-propane.

The aromatic polycarbonates (A) can be branched by building in small amounts, preferably 0.05 to 2.0 mol % (based on the diphenols employed) of compounds which are trifunctional or more than trifunctional, for example those with three or more than three phenolic hydroxyl groups.

The aromatic polycarbonates (A) should as a rule have average molecular weights Mw of 10,000 to 200,000, preferably of 20,000 to 80,000, determined by light scattering.

Small amounts of low-molecular polycarbonates, for example with an average degree of polycondensation of 2 to 20, can also be admixed to the high-molecular polycarbonates of $\overline{M}w$ 10,000 to 200,000.

Chain stoppers, such as, for example, phenol, halogenophenols or alkylphenols, are used in the calculated amounts in a known manner to adjust the molecular weight $\overline{M}w$ of the polycarbonates (A).

The polycarbonates (A) to be employed according to the invention are prepared in a known manner, either by the phase boundary process or by the process in homogeneous solutions (pyridine process), or, if appropriate, by the melt esterification process.

Component (B)

In the context of the invention, polyalkylene terephthalates (B) are reaction products of aromatic dicarboxylic acids or reactive derivatives thereof (for example dimethyl esters) and aliphatic, cycloaliphatic or araliphatic diols and mixtures of these reaction products.

Preferred polyalkylene terephthalates (B) can be prepared from terephthalic acid (or reactive derivatives thereof, for example dimethyl terephthalate) and aliphatic or cycloaliphatic diols with 2-10 C atoms by known methods (Kunststoff-Handbuch (Plastics Handbook), Volume VIII, page 695 et seq., Carl Hanser Verlag, Munich 1973).

Preferred polyalkylene terephthalates (B) contain at least 80 mol %, preferably at least 90 mol %, based on the dicarboxylic acid component, of terephthalic acid radicals and at least 80 mol %, preferably at least 90 mol %, based on the diol component, of ethylene glycol radicals and/or butane-1,4-diol radicals.

The preferred polyalkylene terephthalates (B) can contain, in addition to terephthalic acid radicals, up to 20 mol % of radicals of other aromatic or cycloaliphatic dicarboxylic acids with 8–14 C atoms or aliphatic dicarboxylic acids with 4–12 C atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexanediacetic acid.

The preferred polyalkylene terephthalates (B) can contain, in addition to ethanediol radicals or butane-1,4-diol radicals, up to 20 mol % of other aliphatic diols with 3–12 C atoms or cycloaliphatic ciols with 6–21 C atoms, for example radicals of propane-1,3-diol, 2-ethylpropane-1,3-diol, neopentylglycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3- or 1,6-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexane)-propane, 2,4-dihydroxy-1,1,3,3,-tetramethylcyclobutane, 2,2-bis-(3-β-hydroxyethoxyphenyl)- propane and 2,2-bis-(4-hydroxypropoxyphenyl)-propane (German Offenlegungsschriften Nos. 2,407,674, 2,407,776 and 2,715,932).

The polyalkylene terephthalates (B) can be branched by buidling in relatively small amounts of trihydric or tetrahydric alcohols or tribasic or tetrabasic carboxylic acids, such as are described, for example, in German Offenlegungsschrift No. 1,900,270 and U.S. Pat. No. 3,692,744. Examples of preferred branching agents are trimesic acid, trimellitic acid, trimethylol-ethane and -propane and pentaerythritol.

It is advisable to use not more than 1 mol % of the branching agent, based on the acid component. Particularly preferred polyalkylene terephthalates (B) are those which have been prepared solely from terephthalic acid or reactive derivatives thereof (for example dialkyl esters thereof) and ethylene glycol and/or butane-1,4-diol, and mixtures of these polyalkylene terephthalates.

Preferred polyalkylene terephthalates (B) also include copolyesters which are prepared from at least two of the abovementioned acid components and/or from at least two of the abovementioned alcohol components; particularly preferred copolyesters are poly(ethylene glycol/butane-1,4-diol)terephthalates.

The polyalkylene terephthalates preferably used as component (B) generally have an intrinsic viscosity (I.V.) of 0.4 to 1.5 dl/g, preferably 0.5–1.3 dl/g, in particular 0.6–1.2 dl/g, in each case measured in phenol/o-dichlorobenzene (1:1 parts by weight) at 25° C.

Component (C)

Elastomeric graft polymers (C) which can be used according to the invention include graft copolymers, preferably with glass transition temperatures below −20° C., which are essentially obtainable from at least two of the following monomers: chloroprene, butadiene, isoprene, isobutene, styrene, acrylonitrile, ethylene, propylene, vinyl acetate and (meth)acrylates with 1–8 C atoms in the alcohol component; that is to say graft copolymers such as are described, for example, in "Methoden der Organischen Chemie" ("Methods of Organic Chemistry") (Houben-Weyl), Volume 14/1, Georg Thieme Verlag, Stuttgart 1961, pages 393–406, and in C. B. Bucknall, "Toughened Plastics", Appl. Science Publishers, London 1977. Preferred graft polymers (C) have a gel content of more than 20% by weight, preferably more than 40% by weight.

Examples of preferred graft polymers (C) are polybutadienes, butadiene/styrene copolymers and poly(meth)acrylates grafted with styrene and/or acrylonitrile and/or alkyl(meth)acrylates, for example also copolymers of styrene or alkylstyrene and conjugated dienes (high-impact polystyrene), that is to say copolymers of the type described in German Offenlegungsschrift No. 1,694,173 (=U.S. Pat. No. 3,564,077); examples of preferred graft polymers (C) are also polybutadienes, butadiene/styrene copolymers, butadiene/acrylonitrile copolymers, polyisobutenes or polyisoprenes grafted with acrylates or methacrylates or with vinyl acetate or with acrylonitrile or with styrene or with alkylstyrenes, such as are described, for example, in German Offenlegungsschrift No. 2,348,377 (=U.S. Pat. No. 3,919,353).

Particularly preferred graft polymers (C) are, for example, the ABS polymers such as are described, for example, in German Offenlegungsschrift No. 2,035,390 (=U.S. Pat. No. 3,644,574) or in German Offenlegungsschrift No. 2,248,242 (=British Patent Specification No. 1,409,275).

Examples of particularly preferred graft polymers (C) are graft polymers which can be obtained by a grafting reaction of I. 10–40% by weight, preferably 10–35% by weight and in particular 15–25% by weight, based on the graft product, of at least one (meth)acrylate, and/or a mixture of 10–35% by weight, preferably 20–35% by weight, based on the mixture, of acrylonitrile and 65–90% by weight, preferably 65–80% by weight, based on the mixture, of styrene, on to II. 60–90% by weight, preferably 65–90% by weight and in particular 75–85% by weight, based on the graft product, of a butadiene polymer with at least 70% by weight, based on II, of butadiene radicals as the graft base, in which, preferably, the gel content of the graft base II ≧ 70% (measured in toluene), the degree of grafting G is 0.15 to 0.55 and the average particle diameter $d_{50}$ of the graft polymer (C) is 0.2 to 0.6 μm, preferably 0.3 to 0.5 μm.

(Meth)acrylates I are esters of acrylic acid or methacrylic acid and monohydric alcohols with 1 to 8 C atoms.

In addition to the butadiene radicals, the graft base II can contain up to 30% by weight, based on II, of radicals of other ethylenically unsaturated monomers, such as, for example, styrene, acrylonitrile or esters of acrylic acid or methacrylic acid with 1–4 C atoms in the alcohol component (such as methyl acrylate, ethyl acrylate, methyl methacrylate or ethyl methacrylate). The preferred graft base II consists of pure polybutadiene.

Since, as is known, the grafting monomers I are not completely grafted on to the graft base II in the grafting reaction, the graft polymers (C) to be used according to the invention also contain, in addition to the actually grafted polymers, homopolymers and, where relevant, copolymers of the grafting monomers I used for the grafting reaction.

The degree of grafting G is the weight ratio of grafted-on grafting monomers to graft base, and has no dimensions.

The average particle size $d_{50}$ is the diameter above and below which in each case 50% by weight of the particles lie. It can be determined by means of ultracentrifuge measurements (W. Scholtan and H. Lange, Kolloid. Z. and Z. Polymere 250 (1972), 782–796) or by means of electron microscopy and subsequent particle counting (G. Kämpf and H. Schuster, Angew. Makromolekulare Chemie 14, (1970) 111–129) or by means of light scattering measurements.

Examples of particularly preferred graft polymers (C) include graft polymers of (a) 25–98% by weight, based on the graft polymer (C), of acrylate rubber with a glass transition temperature below −20° C., as the graft base, and (b) 2–75% by weight, based on the graft polymer (C), of at least one polymerisable ethylenically unsaturated monomer the homopolymers of which formed in the absence of (a) or the copolymers of which formed would have a glass transition temperature above 25° C., as the grafting monomers.

The acrylate rubbers (a) of the graft polymers (C) are preferably polymers of alkyl acrylates, if appropriate with up to 40% by weight of other polymerisable ethylenically unsaturated monomers. If the acrylate rubbers used as the graft base (a) (as described on pages 9/10) are in turn already graft products with a diene rubber nucleus, the diene rubber nucleus is not included in the calculation of this percentage. The preferred polymerisable acrylates include $C_1$–$C_8$-alkyl esters, for example the methyl, ethyl, butyl, octyl and 2-ethylhexyl ester; halogenoalkyl esters, preferably halogeno-$C_1$–$C_8$-alkyl esters, such as chloroethyl acrylate, and aromatic esters, such as benzyl acrylate and phenethyl acrylate. They can be used individually or as a mixture.

The acrylic rubbers (a) can be non-crosslinked or crosslinked, and are preferably partially crosslinked.

Monomers with more than one polymerisable double bond can be copolymerised for the crosslinking. Examples of preferred crosslinking monomers are esters of unsaturated monocarboxylic acids with 3 to 8 C atoms and unsaturated monohydric alcohols with 3–12 C atoms or saturated polyols with 2–4 OH groups and with 2–20 C atoms, such as, for example, ethylene glycol dimethacrylate or allyl methacrylate; and in addition polyunsaturated heterocyclic compounds, such as, for example, trivinyl or triallyl cyanurate or isocyanurate or tris-acryloyl-s-triazines, and also polyfunctional vinyl compounds, such as di- and tri-vinylbenzenes; as well as triallyl phosphate and diallyl phthalate.

Preferred crosslinking monomers are allyl methacrylate, ethylene glycol dimethacrylate, diallyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of crosslinking monomers is preferably 0.02 to 5% by weight, in particular 0.05 to 2% by weight, based on the graft base (a).

In the case of cyclic crosslinking monomers with at least three ethylenically unsaturated groups, it is advantageous to restrict their amount to <1% by weight of the graft base (a).

Examples of preferred "other" polymerisable ethylenically unsaturated monomers which, if appropriate, can be used, in addition to the acrylates, for the preparation of the graft base (a) are acrylonitrile, styrene, α-methylstyrene, acrylamides and vinyl $C_1$–$C_6$-alkyl ethers. Preferred acrylate rubbers as the graft base (a) are emulsion polymers having a gel content of $\geqq 60\%$ by weight.

The gel content of the graft base (a) is determined at 25° C. in dimethylformamide (M. Hoffmann, H. Krömer and R. Kuhn, Polymeranalytik I and II (Polymer Analysis I and II), Georg Thieme Verlag, Stuttgart 1977).

Acrylate rubbers as the graft base (a) can also be products which contain, as the core, a crosslinked diene rubber of one or more conjugated dienes, such as polybutadiene, or a copolymer of a conjugated diene and an ethylenically unsaturated monomer, such as styrene and/or acrylonitrile.

The amount of polydiene nucleus in the graft base (a) can be 0.1 to 80% by weight, preferably 10–50% by weight, based on (a). The shell and nucleus can be non-crosslinked, partially crosslinked or highly crosslinked, independently of one another.

Particularly preferred graft bases (a) for graft polymers (C) based on polyacrylates may be summarised as follows:

1. Acrylate polymers and copolymers without a diene rubber nucleus and
2. acrylate polymers and copolymers containing a diene rubber nucleus.

The grafting yield, that is to say the quotient of the amount of monomer (b) grafted on and the amount of grafting monomer (b) used, is as a rule 20 to 80% by weight. This value can be determined as described in M. Hoffmann, H. Krömer and R. Kuhn, Polymeranalytik (Polymer Analysis), Volume 1, Georg Thieme Verlag, Stuttgart 1977.

Preferred grafting monomers (b) are α-methylstyrene, styrene, acrylonitrile, methyl methacrylate and mixtures of these monomers. Preferred grafting monomer mixtures are those of styrene and acrylonitrile in a weight ratio of 90:10 to 50:50.

Such graft polymers (C) based on polyacrylates are described, for example, in German Auslegeschrift No. 2,444,584 (=U.S. Pat. No. 4,022,748) and in German Offenlegungsschrift No. 2,726,256 (=U.S. Pat. No. 4,096,202).

Particularly preferred graft polymers of this type are obtained when 2–20% by weight, preferably 2–15% by weight, based on (C), of monomer (b) are grafted on to 80–98% by weight, preferably 85–97% by weight, based on (C), of the latex of (a) which is completely broken down and suspended in water, in the absence of a suspending agent. The pulverulent graft polymer obtained can then be dried and homogenised with the other components in the desired ratio under the action of shearing forces such that the average particle size $d_{50}$ of (C) in the mixture according to the invention is 0.05 to 3 μm, preferably 0.1 to 2 μm, and in particular 0.2 to 1 μm.

The expression "in the absence of a suspending agent" means the absence of substances which, depending on the type and amount, could suspend the grafting monomers (b) in the aqueous phase. The definition does not exclude the presence of substances which, for example, have had a suspending effect in the preparation of a grafted graft base (a); in such cases, the coagulant or precipitant used for breaking the latex (a) must be added in an amount which compensates the suspending action of the substances employed in the preliminary stage; in other words: it must be ensured that the grafting monomers (b) do not form a (stable) emulsion in the aqueous phase.

A graft polymer (C) prepared in this way in the absence of suspending agents can, as a constituent of the moulding compositions according to the invention, be distributed in the other resin components in an exceptionally low particle size which even survives fairly long processing times at elevated temperature relatively unchanged.

The expression "exceptionally low particle size" means that the number, shape and size of the graft polymer particles to be employed substantially also correspond, even after homogenisation, to the number, shape and size of the graft polymer particles introduced into the other molten resin components.

Those acrylate rubbers which are obtained as an aqueous emulsion (latex) and in which the latex particles contain 1–20% by weight, preferably 1–10% by weight, based on (a), of monomer which has already been grafted on in aqueous emulsion and would give homopolymers or copolymers with glass transition temperatures of >0° C. can also be used as the graft base (a).

Preferred grafted-on monomers of this type are alkyl acrylates, alkyl methacrylates, styrene, acrylonitrile, α-methylstyrene and/or vinyl acetate.

Graft bases (a) of this type are prepared, for example, by emulsion polymerisation or emulsion grafting polymerisation. However, they can also be prepared by preparing an acrylate rubber in solution or bulk and then grafting on the grafting monomers and subsequently converting these rubbers into an aqueous emulsion suitable for further grafting processes.

In addition to the polymers listed on pages 9/10 preferred suitable graft bases (a) for acrylate rubbers of this particular embodiment are thus also graft polymers, prepared in aqueous emulsion, of acrylate polymers or copolymers, which contain, if appropriate, a diene rubber nucleus, and ethylenically unsaturated polymerisable monomers.

Component (D)

The terpolymers (D) to be used according to the invention consist of 85 to 54% by weight of acrylates, 12 to 34% by weight of vinyl esters and 3 to 12% by weight of unsaturated nitriles.

Preferred ranges of amounts are 85 to 60% by weight of acrylates, 12 to 28% by weight of vinyl esters and 3 to 12% by weight of unsaturated nitriles.

The terpolymers (D) to be used according to the invention have a Mooney viscosity of at least 40 Mooney Units (ML 1+4/100° C. according to DIN 53523) and are gel-free (measured in toluene).

They are described in European Pat. No. 9,731 and in German Offenlegungsschrift No. 2,843,041 (Le A 19 019).

They are prepared according to these literature references, by polymerising 75 to 40 parts by weight of an acrylate, 20 to 55 parts by weight of a vinyl ester and 3 to 9 parts by weight of an unsaturated nitrile in aqueous suspension or emulsion in the presence of a monomer-soluble or water-soluble polymerisation initiator at temperatures of 0° to 60° C., preferably 10° to 50° C., up to a conversion of 90%, preferably 80%.

Terpolymers (D) having the preferred composition are prepared using 75 to 45 parts by weight of acrylate, 20 to 48 parts by weight of vinyl ester and 3 to 9 parts by weight of unsaturated nitrile.

The terpolymers (D) to be used according to the invention are not vulcanised, that is to say they are not crosslinked.

Examples of acrylates which may be mentioned are: acrylates with 2-8 C atoms in the alcohol component, such as ethyl, propyl, butyl, hexyl or 2-ethylhexyl acrylate, preferably butyl acrylate.

Examples of unsaturated nitriles which may be mentioned are: acrylonitriles which can be substituted by a methyl group or a chlorine atom, such as methacrylonitrile, acrylonitrile and 2-chloroacrylonitrile, preferably acrylonitrile.

The polymers D have a Mooney viscosity of at least 40 Mooney Units (ML 1+4/100° C. according to DIN 53523). They can be prepared by a process disclosed in European Pat. No. 0,009,731.

The Prior Art

Components (A) to (D) are known as such.

Mixtures of polycarbonates and polyesters are also known (see, for example, German Patent Specification No. 1,187,793 and German Auslegeschrift No. 1,694,124 (Le A 10 435)).

Mixtures of polyesters and graft polymers are also known (see, for example, U.S. Pat. Nos. 3,919,353 and 3,564,077, German Offenlegungsschrift No. 2,659,338 or U.S. Pat. No. 4,096,202 and German Offenlegungsschrift No. 2,726,256).

Mixtures of polycarbonates and polymers are also known (see, for example, Japanese Patent Publication No. 18611/68 (Teijin, Priority 30.6.1965), U.S. Pat. No. 3,663,471 (Le A 11 969), U.S. Pat. No. 3,437,631 (Mo 936), U.S. Pat. No. 4,299,928 (Mo 2,062) or German Offenlegungsschrift No. 3,114,494).

Mixtures of polycarbonates, polyesters and graft polymers are also known (see, for example, U.S. Pat. No. 3,864,428 and German Auslegeschrift No. 2,343,609 or U.S. Pat. No. 4,264,487 and European Offenlegungsschrift No. 25,920 or German Offenlegungsschrift No. 3118526 and European Offenlegungschrift No. 64648).

Moulding compositions of the type in question here are also described, for example, in German Auslegeschrift No. 1,170,141 (=U.S. Pat. No. 3,130,177), British Pat. No. 992,503 (U.S. Pat. No. 3,162,695), German Patent Specification No. 1,569,448 (=British Pat. No. 1,007,724), German Offenlegungsschrift No. 1810993, German Auslegeschrift No. 2,037,419 (=U.S. Pat. No. 3,655,824), German Offenlegunsschrift No. 2,264,269 (=U.S. Pat. No. 3,801,673), German Offenlegungsschrift No. 2,304,214 (=British Pat. No. 1,363,402), German Offenlegungsschrift No. 2,329,585 (Le A 15 024), German Offenlegungsschrift No. 3,031,524 (=U.S. Pat. No. 4,260,693) and U.S. Pat. No. 4,257,937.

Although modification of polycarbonate/polyester mixtures by addition of various polymers leads to polycarbonate/polyester moulding compositions with a number of good properties, an improved stability to weathering influences or an improvement in the critical width, if appropriate in combination with a "good strength in the impact penetration test" at −40° C. (according to DIN 53,443) is worth achieving, for example for use of such moulding compositions on the outside of motor vehicles or in moulded articles of the most diverse dimensions and shape.

As is known, polycarbonates have high Izod notched impact strength values (ASTM D-256). These values, of about 8.54 J/cm (16 ft-lbs/inch), in connection with breaking by plastic fracture are characteristic of test pieces which are narrower than about 3.2 mm (⅛"). Wider test pieces, that is to say 6.35 mm (a ¼") wide, tear as a result of brittle fracture at about 1.33 J/cm (2.5 ft-lbs/inch).

The dependence of the notched impact strength on the width leads to the expression of "critical width", a material parameter which is defined as the width at which an interruption occurs in the graph of the notched impact strength against the sample width. The notched impact strength is measured according to ASTM D 256.

The width of the sample is understood as meaning the edge length of the test bar parallel to the notch. The width of the sample is thus at the same time the length of the notch.

For example, polycarbonate which is based on bisphenol A and has a melt index of 3–6 g/10 minutes at 300° C. (ASTM D-1238) shows an interruption at about 5.71 mm. Mouldings of this material narrower than 5.71 mm break on impact as a result of plastic fracture, whilst thicker mouldings break as a result of brittle fracture.

The dependence of the notched impact strength on the width is a disadvantage, since it tends to limit the suitability of the moulding compositions such that it imposes restrictions on the dimensions and shape of mouldings.

The solutions known hitherto for improving the critical width of polycarbonates, for example the addition of polyolefines (U.S. Pat. No. 3,437,631), the addition of ABS (U.S. Pat. No. 3,663,471) or the incorporation of thiodiphenols (German Offenlegungsschrift No. 2,721,595 (Mo 1,607) or Canadian Patent Specification No. 1,094,738 (Mo 1,607-Can)) are not completely satisfactory; in particular the two-component compositions with polyolefines or with ABS still do not give optimum combinations of properties for specific uses, for example in the field of motor vehicles, on further mixing with polyalkylene terephthalates.

In mixtures of polycarbonates and polyalkylene terephthalates modified by the addition of graft polymers, the extra addition, according to the invention, of the terpolymer increases the critical width without having too adverse an influence on the properties in the impact penetration test or on the heat distortion point.

The moulding compositions according to the invention, consisting of polycarbonates, polyalkylene terephthalates and the terpolymers according to the invention, are superior on the one hand to comparable three-component mixtures of polycarbonates, polyalkylene terephthalates and graft polymers on a polybutadiene basis in respect of brittleness and yellowing, which is to be taken into consideration in the case of external weathering, and are superior on the other hand to comparable three-component mixtures of polycarbonates, polyalkylene terephthalates and polyacrylates in respect of crack formation and greying of the surface. With the three-component mixtures containing polyacrylate, these phenomena occur after only brief contact with, in particular, methanol-containing benzine which is a particular disadvantage, especially in pigmented moulding compositions, because of the associated shift in colour.

Such disadvantages prevent mouldings produced from these moulding compositions being used, for example, on the outside of motor vehicles, where heavy exposure to weathering influences occurs and contact with fuels cannot be excluded.

The three-component mixtures according to the invention of polycarbonates, polyalkylene terephthalates and terpolymers thus have a good impact strength in combination with stability to weathering influences and surface resistance to benzine and other types of fuels.

Technical Application (a) The moulding compositions according to the invention of polycarbonates and terpolymers can be processed into moulded articles in the customary manner on customary polycarbonate processing machines at temperatures of 260° C. to 310° C., and can be used in all cases where the known polycarbonates have hitherto been used, with or without an impact strength modifier. They can also contain the customary additives, such as processing auxiliaries, filler or reinforcing materials, stabilisers or flame-retarding agents.

(b) The moulding compositions according to the invention of polycarbonates, polyalkylene terephthalates and terpolymers can contain the customary additives such as lubricants, mould release agents, nucleating agents, stabilisers, filler and reinforcing substances, flame-retarding agents and dyestuffs.

The moulding compositions according to the invention of polycarbonates, polyalkylene terephthalates and terpolymers can contain up to 60% by weight, based on the total weight of reinforced moulding composition, of customary filler and/or reinforcing substances. Preferred reinforcing substances are glass fibres. Preferred fillers, which may also have a reinforcing effect, are glass beads, mica, silicates, quartz, talc, titanium dioxide and wollastonite.

Variants of these three-component moulding compositions which have been rendered flame-retardant contain flame-retarding agents in a concentration of generally less than 30% by weight, based on the total weight of the moulding compositions which have been rendered flame-retardant.

The flame-retarding agents known for polycarbonates or polyesters are suitable, such as, for example, polyhalogenodiphenyls, polyhalogenodiphenyl ethers, polyhalogenophthalic acids and derivatives thereof and polyhalogeno-oligocarbonates and -polycarbonates, the corresponding bromine compounds being particularly effective. They also as a rule contain a synergist, such as, for example, antimony trioxide.

The moulding compositions accordng to the invention can be injection-moulded at composition temperatures of 260° to 280° C. and at mould temperatures of 60° to 70° C.

They are used industrially, for example, on the outside of motor vehicles, for example as bumpers or impact aprons.

(c) The moulding compositions according to the invention of polycarbonates, polyalkylene terephthalates, graft polymers and terpolymers are particularly suitable, for example, for the production of searchlight reflectors, ventilator propellers or gears or similar moulded articles.

They can be injection-moulded at composition temperatures of 260° to 280° C. and at mould temperatures of 60° to 70° C.

The moulding compositions according to the invention can contain customary additives, such as lubricants, mould release agents, nucleating agents, stabilisers, filler and reinforcing substances, flame-retarding agents and dyestuffs.

The moulding compositions can contain up to 60% by weight, based on the total weight of reinforced moulding composition, of customary filler and/or reinforcing substances.

Preferred reinforcing substances are glass fibres. Preferred fillers, which can also have a reinforcing effect, are glass beads, mica, silicates, quartz, talc, titanium dioxide and wollastonite.

Variants of these four-component moulding compositions which have been rendered flame-retardant contain flame-retarding agents in a concentration of generally less than 30% by weight, based on the total weight of the moulding compositions which have been rendered flame-retardant.

All the flame-retarding agents known for polycarbonates, polyesters or graft polymers are suitable, such as, for example, polyhalogenodiphenyls, polyhalogenodiphenyl ethers, polyhalogenophthalic acids and derivatives thereof and polyhalogeno-oligocarbonates and -polycarbonates, the corresponding bromine compounds being particularly effective. They also as a rule contain a synergist, such as, for example, antimony trioxide.

EXAMPLE 1

A polycarbonate which is based on bisphenol A and has a relative solution viscosity of 1.29, measured in methylene chloride in a concentration of 0.5 g/100 ml of $CH_2Cl_2$ at 25° C., and a terpolymer consisting of 77% of butyl acrylate, 17% of vinyl acetate and 6% of acrylonitrile having a Mooney viscosity of 40 Mooney Unites (ML 1+4/100° C., according to DIN 53523) are mixed, in the amounts according to the following table, at 270° C. in a suitable machine and the resulting materil is processed at 290° C. in an injection-moulding machine to test bars of various widths. The notched impact strength test is performed on these moulded articles according to ASTM D 256 and the width above which the notched impact strength is drastically lower is determined.

|  | % by weight | % by weight | % by weight |
| --- | --- | --- | --- |
| Polycarbonate | 95 | 92.5 | 90 |
| Terpolymer | 5 | 7.5 | 10 |
| Critical width |  |  |  |
| At room temperature | >8 mm | >8 mm | >8 mm |
| At 0° C. | 4 mm | >8 mm | >8 mm |

By itself, the polycarbonate used has a critical width of 4.8 mm at room temperature.

II. EXAMPLE 1 (all the parts data are parts by weight)

40 parts of polybutylene terephthalate with an intrinsic viscosity (I.V.) of 1.16 dl/g (measured in phenol/o-dichlorobenzene (1:1 parts by weight) at 25° C.), 52 parts of a polycarbonate which is based on bisphenol A and has a relative solution viscosity of 1.29 (measured in methylene chloride in a concentration of 0.5 g/100 ml of $CH_2Cl_2$ at 25° C.), 7 parts of the terpolymer of Example I, 1 consisting of 77% of butyl acrylate, 17% of vinyl acetate and 6% of acrylonitrile, and 1 part of a known grey pigment consisting of a mixture of $TiO_2$ and lamp black, such that the moulding composition has a grey colour, are mixed and granulated at 270° C. in a suitable machine.

The granules are processed in an injection-moulding machine at a composition temperature of 270° C. and a mould temperature of 60° C. to give moulded articles corresponding to DIN 53, 453=ISO/R 179 (standard bars and flat bars).

The standard bars are clamped, in accordance with DIN Draft 53,449, part 3, over a metal screen such that they have an edge fibre elongation of 0.6%. In each case two samples are immersed for 5 minutes each in two different liquids, which serve as a fuel simulant: fuel a consists of 50% of isooctane and 50% of toluene fuel b consists of 42.5% of isooctane, 42.5% of toluene and 15% of methanol The crack formation is evaluated on these samples.

To test for the tendency towards greying, in each case two standard bars are immersed, without tension, in the media for 1 minute and the greying is then evaluated.

Result: The samples exhibit neither visible greying nor visible cracks.

The product has a notched impact strength, measured according to ISO/R 179, of 56 kJ/m² at room temperature and 8 kJ/m² at −40° C.

The heat distortion point (Vicat softening temperature VST Method B), measured according to ISO 306 (DIN 53,460), is 117° C.

II. EXAMPLE 2 (comparison example)

40 parts of polybutylene terephthalate (as in Example II, 1), 52 parts of polycarbonate (as in Example II, 1), 1 part of the pigment (as in Example II, 1) 5 parts of a rubber modifier and 2 parts of a copolyethylene are mixed, granulated and processed to moulded articles as in Example II, 1.

The rubber modifier consists of 79.2 parts of n-butyl acrylate, as the graft base, which has been cross-linked with 0.4 part of 1,3-butylene diacrylate and into which 0.4 part of diallyl maleate has been copolymerised as the grafting monomer, and 20 parts of polymethacrylate, as the grafted layer.

The copolyethylene consists of 7% of n-butyl acrylate, 4% of acrylic acid and 84% of ethylene.

The properties of the standard bars in respect of a fuel simulant were tested as described in Example 1.

Result: In isooctane/toluene: cracks and slight greying. In isooctane/toluene+methanol: no cracks but severe greying. Critical width: 4.7 mm.

The notched impact strength, measured as in Example 1, is 57 kJ/m² at room temperature and 7 kJ/m² at −40° C.

Out of 10 round plates, 5 samples are tough in the impact penetration test at −40° C. according to DIN 53,443, whilst the remaining 5 samples undergo brittle fracture.

The heat distortion point (measured as in Example 1) is 123° C.

II. EXAMPLE 3 (comparison example)

40 parts of polybutylene terephthalate (as in Example II, 1) and 60 parts of polycarbonate (as in Example II, 1) are mixed, processed to moulded articles and tested in a fuel simulant as described in Example II, 1.

Result: Cracks appear in both media. The cracks are more severe in the methanol-free medium than in the methanol-containing medium. The tendency towards greying cannot be evaluated with these non-pigmented samples.

The notched impact strength is 5 kJ/m² at room temperature, and the heat distortion point is 105° C.

III. EXAMPLE 1

40 parts by weight of polybutylene terephthalate with an intrinsic viscosity (I.V.) of 1.16 dl/g/measured in phenol/o-dichlorobenzene (1:1 parts by weight) at 25° C.), 52 parts by weight of a polycarbonate which is based on bisphenol A and has a relative solution viscosity of 1.29 (measured in methylene chloride in a concentration of 0.5 g/100 ml of $CH_2Cl_2$ at 25° C.), 1 part by weight of a known grey pigment consisting of a mixture of $TiO_2$ and lamp black such that the moulding composition has a grey colour, 2 parts by weight of the terpolymer of Example I, 1 consisting of 77% of butyl acrylate, 17% of vinyl acetate and 6% of acrylonitrile, and 5 parts of a rubber modifier consisting of 79.2% of n-butyl acrylate, as the graft base, which is crosslinked with 0.4% of 1,3-butylene diacrylate and into which 0.4% of diallyl maleate has been copolymerised as the grafting monomer, and 20% of polymethyl methacrylate as the grafted layer, are mixed and granulated at 270° C. in a suitable machine.

The granules are processed in an injection-moulding machine at a composition temperature of 270° C. and a mould temperature of 60° C. to test bars of various widths. The notched impact strength test is performed on these moulded articles according to ASTM D 256 and the width above which the notched impact strength is drastically lower is determined.

The present mixture is found to have a critical width of 8 mm by this method.

All the 10 round plates tested were tough in the impact penetration test at −40° C. according to DIN 53,443.

We claim:

1. Thermoplastic moulding compositions comprising mixtures containing (A) and (D)+(B)  (i)

or (A) and (D)+(B)+(C)  (ii)

wherein
   - (A) is thermoplastic aromatic polycarbonates with weight-average molecular weight $\overline{M}_w$ between 10,000 and 200,000 with $\overline{M}_w$ determined by means of light scattering;
   - (B) is thermoplastic polyalkylene terephthalate in a ratio of polycarbonate to polyalkylene terephthalate of between 99:1 and 1:99;
   - (C) is elastomeric graft polymer in amounts of 1 to 30% by weight, based on the sum of the weights (A) and (B); and
   - (D) is a terpolymer which contains 85 to 54% by weight of acrylates, 12 to 34% by weight of vinyl esters and 3 to 12% by weight of unsaturated nitriles, having a Mooney viscosity of at least 40 Mooney Units and is gel-free measured in toluene, wherein the amount by weight of terpolymer (D) is, if (C) and (B) are present, between 0.5 and 7% by weight, based on the sum of the weights (A)+(B), or, if (C) is absent but (B) is present, between 1 and 30% by weight, based on the sum of the weights (A)+(B).

2. Thermoplastic moulding compositions according to claim 1, characterised in that the terpolymer component (D) consists of 85 to 60% by weight of acrylate, 12 to 28% by weight of vinyl esters and 3 to 12% by weight of unsaturated nitriles.

3. Thermoplastic moulding compositions according to claim 1, characterised in that the amount by weight of terpolymer (D) is, if (C) and (B) are present, between 1 and 5% by weight, based on the sum of the weights (A)+(B), or, if (C) is absent but (B) is present, between 5 and 25% by weight, based on the sum of the weights (A)+(B).

4. Thermoplastic moulding compositions according to claim 1, characterised in that they consist of (A), (B), and 1 to 30% by weight of (D), based on the sum of the weights (A)+(B), the ratio of (A):(B) being between 99:1 and 1:99.

5. Thermoplastic moulding compositions according to claim 4, characterised in that they consist of (A), (B), and 5 to 25% by weight of (D), based on the sum of the weights of (A)+(B), the ratio of (A):(B) being between 99:1 and 1:99.

6. Thermoplastic moulding compositions according to claim 1, characterised in that they consist of (A), (B), 0.5 to 7% by weight of (D), based on the sum of the weights (A)+(B), and 1 to 30% by weight of (C), based on the sum of the weights (A)+(B), the ratio of (A):(B) being between 99:1 and 1:99.

7. Thermoplastic moulding compositions according to claim 6, characterised in that they consist of (A), (B), 1 to 5% by weight of (D), based on the sum of the weights of (A)+(B), and 1 to 30% by weight of (C), based on the sum of the weights of (A)+(B), the ratio of (A):(B) being between 99:1 and 1:99.

8. Thermoplastic moulding compositions according to claim 1 comprising (A) and (D)+(B) or (A) and (D)+(B)+(C) and further comprising lubricants, mold release agents, nucleating agents, stabilizers, fillers, reinforcing materials, flame-retarding agents or dyestuffs.

* * * * *